(12) United States Patent
Straker et al.

(10) Patent No.: US 11,927,289 B2
(45) Date of Patent: Mar. 12, 2024

(54) VALVE

(71) Applicant: TECHFLOW MARINE LIMITED, Cramlington (GB)

(72) Inventors: James Straker, Cramlington (GB); Colin Rutherford, Cramlington (GB)

(73) Assignee: TECHFLOW MARINE LIMITED, Cramlington (GB)

( * ) Notice: Subject to any disclaimer, the term of this patent is extended or adjusted under 35 U.S.C. 154(b) by 309 days.

(21) Appl. No.: 17/431,086

(22) PCT Filed: Feb. 21, 2020

(86) PCT No.: PCT/GB2020/050409
§ 371 (c)(1),
(2) Date: Aug. 13, 2021

(87) PCT Pub. No.: WO2020/169982
PCT Pub. Date: Aug. 27, 2020

(65) Prior Publication Data
US 2022/0252193 A1    Aug. 11, 2022

(30) Foreign Application Priority Data
Feb. 22, 2019 (GB) .................................. 1902467

(51) Int. Cl.
*F16L 37/28* (2006.01)
*B63B 27/34* (2006.01)
(Continued)

(52) U.S. Cl.
CPC .............. *F16L 37/28* (2013.01); *B63B 27/34* (2013.01); *F16K 1/12* (2013.01); *F16K 1/221* (2013.01)

(58) Field of Classification Search
CPC ......... F16L 37/28; F16L 37/36; F16L 37/367; F16L 37/407; F16L 37/44; F16L 1/12; F16L 1/223; B63B 27/34
See application file for complete search history.

(56) References Cited

U.S. PATENT DOCUMENTS 5,904,302 A * 5/1999 Brown ...................... B64F 1/28
141/386
7,174,930 B2 * 2/2007 Poldervaart ............. B63B 27/34
114/230.15
(Continued)

FOREIGN PATENT DOCUMENTS

CN    101336190 A    12/2008
CN    101581392 A    11/2009
(Continued)

OTHER PUBLICATIONS

International Preliminary Report for U.S. Appl. No. 17/431,086 dated Sep. 2, 2021 (10 pages).
(Continued)

*Primary Examiner* — Timothy L Maust
(74) *Attorney, Agent, or Firm* — FOLEY & LARDNER LLP

(57) ABSTRACT

A valve arrangement for a hose end coupler of a transfer hose for the offloading of hydrocarbons from an offshore floating production storage and offloading vessel (FPSO) to a shuttle tanker is described. The valve arrangement comprises a linear valve comprising a linear valve actuator movable between a first position whereat the valve is closed and a second position whereat the valve is open; a secondary valve comprising a secondary valve actuator movable between a first position whereat the valve is closed and a second position whereat the valve is open; the linear valve actuator and the secondary valve actuator are operatively coupled so movement of the linear valve actuator effects a (Continued)

corresponding movement of the secondary valve actuator. A hose end coupler with the valve arrangement, and a transfer hose and transfer system and method incorporating such a hose end coupler with the valve arrangement are also described.

24 Claims, 5 Drawing Sheets

(51) Int. Cl.
*F16K 1/12* (2006.01)
*F16K 1/22* (2006.01)

(56) References Cited

U.S. PATENT DOCUMENTS

| | | | | |
|---|---|---|---|---|
| 7,909,365 | B2 * | 3/2011 | Krywitsky | B67D 7/3218 285/85 |
| 7,975,769 | B2 * | 7/2011 | Pollack | B63B 35/4413 166/344 |
| 8,286,678 | B2 * | 10/2012 | Adkins | B63B 27/34 114/230.15 |
| 8,720,487 | B2 * | 5/2014 | Cooley | E02F 9/2275 137/614.05 |
| 9,199,700 | B2 * | 12/2015 | Fargier | F17D 1/00 |
| 9,764,801 | B2 * | 9/2017 | Syvertsen | B63B 39/06 |
| 10,563,773 | B2 * | 2/2020 | Roth | F16K 31/602 |
| 2007/0289650 | A1 | 12/2007 | Krywitsky | |
| 2014/0369765 | A1 * | 12/2014 | Fargier | B63B 35/44 114/74 R |
| 2016/0137273 | A1 * | 5/2016 | Syvertsen | B63B 39/06 114/271 |

FOREIGN PATENT DOCUMENTS

| | | |
|---|---|---|
| DE | 20 2006 002 979 U1 | 5/2006 |
| EP | 3 428 500 A1 | 1/2019 |
| WO | WO-2004/076906 A1 | 9/2004 |

OTHER PUBLICATIONS

First Office Action on CN Application 202080030254.1 dated Jan. 5, 2023 (12 pages).

International Search Report and Written Opinion dated Apr. 14, 2020, for International Patent Application No. PCT/GB2020/050409. (12 pages).

* cited by examiner

VALVE

CROSS-REFERENCE TO RELATED PATENT APPLICATIONS

This application is a National Phase Entry of International Application No. PCT/GB2020/050409, filed Feb. 21, 2020, which claims benefit of and priority to United Kingdom Patent Application No. GB 1902467.8, filed Feb. 22, 2019, both of which are incorporated by reference herein in their entirety.

BACKGROUND

The invention relates to a valve arrangement for a hose end coupler for use in a transfer hose for the offloading of hydrocarbons from an offshore floating production storage and offloading vessel (FPSO) to a shuttle tanker, and to a hose end coupler with such a valve arrangement, and a transfer hose and transfer system and method incorporating such a hose end coupler with such a valve arrangement.

INTRODUCTION

A floating production storage and offloading vessel (FPSO) is used by the offshore oil and gas industry for the production and processing of hydrocarbons, and in particular crude oil. An FPSO vessel is designed to receive and store oil until it can be offloaded onto a shuttle tanker.

Offloading of crude oil from an offshore FPSO vessel to a shuttle tanker requires that a transfer hose be connected between both vessels. Offloading systems are typically integrated into the hull of the FPSO and will enable a product transfer hose to be deployed to the shuttle tanker for connection. The connection to the shuttle tanker is made with a valve and coupling arrangement that is integrated into the transfer hose end functionally known as a hose end coupler.

The product transfer hose will typically be stored on a rotating reel to enable deployment and recovery operations to be carried out and provide storage for the hose between transfer operations. The hose is typically deployed to the tanker via a messenger line and connected to the Bow Loading System or BLS. Following the transfer of the specified amount of oil, the system is typically flushed with seawater prior to being disconnected and recovered onto the reel on the FPSO.

To be compatible across multiple platforms the general form and functionality of the offloading Hose End Coupler has become essentially standard in form, with that standard form sometimes being referred to as a "North Sea Type Hose End Valve" or as an "Offloading Hose Termination Piece" or OHTP.

The accepted requirements for such a hose end coupler are referred to in the following documents for example:

Oil Companies International Marine Forum—Offshore Loading Safety Guidelines.

Statoil TR2380 Technical & Operational Requirements for Shuttle Tankers.

An example of such a valve is shown in FIG. 1.

The valve is a linear valve comprising a spring loaded hydraulically damped linear valve member in a valve housing, and is shown here in the open and closed conditions (respectively on the right and on the left). When the transfer hose is in storage, the hose end coupler forms the end of the hose string which will typically be carried on a hose reel aboard the FPSO. During an operation, the hose end coupler is connected to a coupling on board the shuttle tanker BLS, the connection being configured such that an actuator in the BLS acts to open the valve in the direction shown by the arrows in the right hand configuration of FIG. 1 to enable fluid transfer to take place from a reservoir in the FPSO through the transfer hose to a reservoir in the shuttle tanker. Once the transfer of oil has taken place, the hose remains connected whilst a flushing operation is carried out using sea water to remove oil contamination and residue from the hose and hose end coupler. The hose may then be disconnected.

The inset shows enlarged detail of the sealing effected by the linear value, which is typically effected by a captive sealing element. In the example shown this is the single o-ring seal 1 shown in face-to-face sealing engagement with a sealing surface 2 of the valve housing. This represents a potential point of weakness in the standard design. Increasingly, in particular as a consequence of environmental considerations, additional leakage-prevention features have been built into transfer systems for the off-loading of an FPSO, for example including levels of redundancy. The o-ring seal of the standard hose end coupler design does not have this redundancy.

In respect of normal shut down, this may be less of a problem, since the hose has been flushed with sea water, and any minor leakage during disconnection will essentially be of sea water. The same may not be true during a shut down and disconnection in an emergency scenario where there is no time for such a flushing operation and where leakage during disconnection may thus contain significant hydrocarbon residues.

Emergency scenarios which may require urgent disconnection are not uncommon in the difficult environment presented by offshore operation. Due to the close proximity of the vessels and the nature of the fluid being transferred, offloading operations present elevated risks concerning vessel collision and pollution. To mitigate this risk, the process is closely monitored and controlled by dedicated subsystem elements that will generate appropriate warnings or even initiate automatic shut down if any parameter of the process exceeds its specific limit value. This process is known as Emergency Shut Down or ESD.

Some examples from what are very complex control systems are . . . .

1. Relative position of the vessels (operational areas for tanker are precisely defined)
2. Process pressures temperatures etc.
3. Connections status in hose string/flow line.
4. Position status of process valves (both vessels).
5. Environmental conditions (wind, waves, currents etc).

In the event that an alarm is raised and the situation is not recovered appropriately, the ESD procedure will be initiated. This will ultimately result in the hose end coupler being closed and prematurely disconnected from the tanker BLS.

The functionality of the hose end coupler means that there is a very limited area that can be used to seal the valve when it is closed. The oil products passed through the valve are known to contain contaminates. This is not an issue during normal operation as the flushing operation will remove these. However, during and ESD event and subsequent disconnection, full sealing of the valve may be compromised resulting in an escape of oil into the ocean. This is not acceptable at any level regardless of the amount of contamination. It is desirable for this risk to be mitigated.

A particular problem is associated with the face to face seal effected by the linear valve with one of the faces containing a captive sealing element. the face to face functionality of the valve could trap contaminants and compromise its effectiveness. However, it is not an option to simply change the current face to face type of valve as the arrangement has been developed in conjunction with the tanker BLS connection and is hence a common interface with all tankers in service.

A solution is needed for mitigation of this perceived risk in the form of an improved valve design for the specific application of offshore offloading which is nevertheless fully compatible with current tanker offloading mechanisms.

SUMMARY OF THE INVENTION

In accordance with the invention in a first aspect a valve arrangement for a hose end coupler of a transfer hose for use in the offloading of hydrocarbons from an offshore floating production storage and offloading vessel (FPSO) to a shuttle tanker comprises:

a linear valve comprising a linear valve actuator movable between a first position whereat the valve is closed and a second position whereat the valve is open;

a secondary valve comprising a secondary valve actuator movable between a first position whereat the valve is closed and a second position whereat the valve is open;

wherein the linear valve actuator and the secondary valve actuator are operatively coupled such that movement of the linear valve actuator between the first position and the second position effects a corresponding movement of the secondary valve actuator between the first position and the second position.

Thus, by virtue of the operative couple between the linear valve actuator and the secondary valve actuator, the act of opening the linear valve actuator opens the secondary valve actuator and the act of closing the linear valve actuator closes the secondary valve actuator. The two valves are opened and closed together building in a degree of redundancy. The valve arrangement is a dual valve arrangement in which the two valves are functionally linked to be operated together.

However, the primary valve remains the linear valve. In the intended application of the dual valve arrangement of the invention as a hose end coupler for use in a transfer hose the linear valve will comprise the distalmost valve at the hose end, and may apply standard design principles, and at least be adapted in use to be actuated by a coupling action of the coupling mechanism on a shuttle tanker and for example the bow loading system of such a tanker in the standard manner.

Advantageously for example, the linear valve may be adapted in use to be so actuated in fully compatible manner with existing actuation mechanisms on a shuttle tanker that are configured to actuate hose end couplers of the above discussed "North Sea Type Hose End Valve" or "Offloading Hose Termination Piece" type. Such a hose end coupler operating system has become an industry standard, and the person skilled in the art will appreciate the design features that need to be inferred to ensure that a linear valve comprising the primary valve of a dual valve arrangement in accordance with the invention has such operational compatibility to be actuated in use by a coupling action of the coupling mechanism on the shuttle tanker.

Advantageously therefore the valve arrangement of the first aspect of the invention is combined with a coupling arrangement in a hose end coupler, the coupling arrangement being configured to correspond to the coupling arrangement of a standard hose end coupler and thereby be configured such that the linear valve is adapted in use to be actuated by an standard actuation mechanism on a shuttle tanker.

The direct effect of this coupling action in coupling the hose end coupler arrangement to the coupling mechanism on a shuttle tanker and for example the bow loading system of such a tanker is to operate the linear valve actuator and open the linear valve in familiar manner by moving the linear valve actuator out of a face to face sealing engagement with a portion of the valve housing. The secondary effect of this coupling action is simultaneously to cause the secondary valve to open via the agency of the operative coupling between the linear valve and the secondary valve. Equivalently the direct effect of decoupling the hose end coupler arrangement from the coupling mechanism on a shuttle tanker and for example the bow loading system of such a tanker is to allow the linear valve to close. The secondary effect of this coupling action is simultaneously to cause the secondary valve to close via the agency of the operative coupling between the linear valve and the secondary valve. This secondary closure may be particularly effective in mitigating the problems during emergency shut down.

The solution being proposed for mitigation of the perceived risk of emergency shut down is in the form of a new valve design for the specific application of offshore offloading that is based upon the current valve as the primary valve to achieve tanker compatibility by utilising the same sealing methodology, but is characterised in that it incorporates a secondary valve operationally coupled to the primary valve.

Advantageously, as the secondary valve of the dual valve arrangement of the invention is operated by the linear valve of the dual valve arrangement of the invention, only the linear valve needs to be directly compatible with and adapted to be operated by a coupling mechanism on a shuttle tanker and for example the bow loading system of such a tanker. The secondary valve may be of an alternative design, which may be selected to improve the effectiveness of the twin valve arrangement by giving additional functionality.

In a preferred embodiment, the secondary valve comprises a rotating valve having a secondary rotating valve actuator carried within a valve housing and mounted to rotate between a first position whereat the valve is closed and for example whereat the secondary valve actuator is in sealing engagement with a portion of a valve housing and a second position whereat the valve is open and for example whereat the secondary valve actuator is no longer in sealing engagement with a portion of the valve housing. The operative coupling between the linear valve actuator and the secondary valve actuator is configured such that linear movement of linear valve actuator causes rotation of the secondary rotating valve actuator.

Advantageously, rotational valves may "sweep" their sealing faces upon opening and closing and hence may be better able to clear contamination from critical surfaces. It is not an option to change the linear valve for a rotational valve, as compatibility must be maintained with the actuating mechanism of a standard coupling mechanism on a shuttle tanker. However, the invention maintains this compatibility by using a standard linear valve as a primary valve, while functionally linking the operation of the primary valve to the secondary valve which may have such functionality.

In a particularly preferred embodiment the secondary valve comprises a rotating butterfly valve. That is to say, the secondary valve comprises a rotating valve in which the valve actuator comprises a disc carried within a valve housing that rotates between a first position whereat the valve is closed and for example whereat an edge portion of the disc is in sealing engagement with a portion of a valve housing and a second position whereat the valve is open and for example whereat the edge portion of the disc is no longer in sealing engagement with a portion of the valve housing. Conveniently the disc actuator is carried within a valve housing and an edge portion of the disc actuator and a corresponding portion of the valve housing are adapted to provide mutually engageable sealing surfaces when the disc actuator is in the first position. One or both sealing surfaces may be provided with a sealing element and for example a captive sealing element.

A rotating butterfly valve may advantageously exhibit a particularly effective debris sweeping action.

The linear valve of the dual valve arrangement is advantageously configured to be directly compatible with and adapted to be operated by a coupling mechanism on a shuttle tanker and for example the bow loading system of such a tanker.

The linear valve comprises a linear valve actuator translatable between a first position whereat the valve is closed and a second position whereat the valve is open. In practice in use, the hose end coupler arrangement is mounted into a product transfer hose end such that the linear valve actuator is translatable in a hose axial direction.

In some embodiments, the actuator may be contained within a valve housing and mounted to be translatable between a first position whereat the linear valve actuator is in a face to face sealing engagement with a portion of a valve housing and a second position whereat the linear valve actuator is no longer in a face to face sealing engagement with the said portion of the valve housing. Conveniently the linear valve actuator is carried within a valve housing and a distal portion of the linear valve actuator and a corresponding portion of the valve housing are adapted to provide mutually engageable sealing surfaces when the linear valve actuator is in the first position. One or both of the sealing surfaces may be provided with a sealing element and for example a captive sealing element.

In some embodiments the linear valve actuator is a piston-type actuator, comprising a linearly translatable piston formation carried by and for example within and translatable relative to a holding formation so as to be movable between the first position and the second position. Conveniently a distal portion of the piston formation and an engagement portion of an inner face of the valve housing are adapted to provide mutually engageable sealing surfaces when the linear valve is in the first position Preferably the piston formation is biased to return the first position and for example is spring biased. In some embodiments the bias is damped by provision of a damper tending to urge against the biasing direction, for example by provision of a hydraulic or pneumatic damper tending to urge against the biasing direction. A suitable configuration of damped biasing may comprise an axially mounted helical spring disposed around a central hydraulic or pneumatic damper cylinder.

A key characterising feature of the invention is that the linear and secondary valves are operatively coupled such that movement of the linear valve actuator between the first position and the second position effects a corresponding movement of the secondary valve actuator between the first position and the second position. Any suitable operative coupling may be used. For example a physical or virtual actuating connection may be provided between the linear valve and the secondary valve.

Conveniently in some embodiments, the actuating connection may comprise a direct physical link between the linear valve actuator and the secondary valve actuator. For example, the direct physical link may comprise a mechanical link. For example, the direct physical link may comprise a hydraulic link.

In the preferred embodiment where the linear valve actuator is a rotating butterfly valve in which the rotating valve actuator comprises a disc actuator and the linear valve actuator is a translatable actuator such as a piston formation, a direct physical link such as a direct mechanical link may be provided between the linear valve actuator and the disc actuator, for example mounted off-centre on the disc actuator, such that translation of the linear valve actuator acts directly to cause rotation of the disc actuator.

In some embodiments the linear valve of the twin valve arrangement and the secondary valve of the twin valve arrangement may be carried within a common valve housing.

In some embodiments the linear valve of the twin valve arrangement and the secondary valve of the twin valve arrangement may each be carried within separate valve housings.

Advantageously for example this may allow for the secondary valve of the twin valve arrangement to be fabricated separately from and retrofitted to a transfer hose carrying an existing linear valve of conventional design and functionality, The valve arrangement of the first aspect of the invention preferably includes a coupling formation at an end thereof being the distalmost end relative to a transfer hose in which it is mounted that is adapted to engage with a complementary coupling arrangement on an offshore shuttle tanker, and for example to a complementary coupling arrangement on a bow loading system of such a tanker, with the valve arrangement being configured such that the action of effecting such a coupling causes the linear and secondary valves to move from the closed to the open position, and being configured similarly such that the action of disconnecting such a coupling causes the linear and secondary valves to move from the open to the closed position.

The dual valve arrangement of the first aspect of the invention is intended for use as the hose end coupler of a transfer hose for the offloading of hydrocarbons from an offshore floating production storage and offloading vessel (FPSO) to a shuttle tanker. Thus, more completely, the invention comprises the valve as above described disposed as a hose end coupler in a transfer hose for use in the offloading of hydrocarbons from an offshore floating production storage and offloading vessel (FPSO) to a shuttle tanker.

In a more complete second aspect of the invention a product transfer hose for the offloading of hydrocarbons from an offshore floating production storage and offloading vessel (FPSO) to a shuttle tanker comprises an elongate hose defining a conduit for the passage of hydrocarbons between a first end and a second end and having at one of the said ends a valve arrangement in accordance with the first aspect of the invention.

The other of the said ends will in use be carried on and in fluid communication with a fluid reservoir of an offshore FPSO vessel in familiar manner. The transfer hose will typically be stored on a stowage and deployment mechanism such as a rotating reel to enable deployment and recovery and provide storage for the hose between transfer operations. The valve arrangement in accordance with the first aspect of the invention will be disposed as a hose end coupler in the end of the transfer hose distal of the FPSO to connect to a compatible mechanism of a shuttle tanker on deployment.

The valve arrangement of the first aspect of the invention is provided at the said one of the ends of the elongate hose arranged such that the linear valve is positioned distalmost of the FPSO vessel at the hose outlet and the secondary valve is positioned behind the linear valve, spaced away from the hose outlet. In this way, it is possible to configure the linear valve with a standard compatible design while providing secondary functionality through the secondary valve. Thus, a dual valve arrangement in accordance with the first aspect of the invention when incorporated into a transfer hose in accordance with the second aspect of the invention is compatible across multiple platforms in accordance with the existing standards that have become accepted for an offshore OHTP. In particular, the elongate hose is provided with a hose end coupler which is compatible with existing engagement systems provided on standard offshore shuttle tankers, and in particular on the standard bow loading systems thereof.

During use, a stowage and deployment mechanism typically integrated into the FPSO and including a product transfer hose in accordance with second aspect of the invention effects deployment of the product transfer hose towards the shuttle tanker for connection. The distal end of the product transfer hose is coupled to the shuttle tanker and for example to a bow loading system thereof.

Preferably to facilitate this, the said one of the ends of the transfer hose includes a coupling formation that is adapted to engage with a complementary coupling arrangement on such an off shore shuttle tanker, and for example to a complementary coupling arrangement on a bow loading system of such a shuttle tanker, with the valve arrangement carried in the end of the transfer hose being configured such that the action of effecting such a coupling causes the linear and secondary valves to move from the closed to the open position. Similarly, the act of decoupling the transfer hose causes the linear and secondary valves to move back to the closed position in the manner above described.

This provides the potential advantages set out above, in particular in an emergency shut down scenario.

In a further yet more complete third aspect of the invention, an off-loading system for the off-loading of hydrocarbons from an offshore floating production storage and offloading vessel (FPSO) to a shuttle tanker comprises: an FPSO, a shuttle tanker, and a transfer hose fluidly coupled to the FPSO and selectively fluidly coupleable to the shuttle tanker, said transfer hose comprising a transfer hose in accordance with the second aspect of the invention, and provided with an end valve in accordance with the first aspect of the invention at the end of the transfer hose configured to be fluidly coupleable to the shuttle tanker.

In an operational state the off-loading system is provided with the end valve at the end of the transfer hose fluidly coupled to the shuttle tanker.

In a yet further embodiment, the invention provides a method for the off-loading of hydrocarbons from an offshore floating production storage and offloading vessel (FPSO) to a shuttle tanker comprising the use of a hose in accordance with the second aspect of the invention having a valve in accordance with the first aspect of the invention.

Specifically, the method comprises:
  providing a hose in accordance with the second aspect of the invention with a valve arrangement in accordance with the first aspect of the invention at one end thereof;
  fluidly connecting the other end of the hose to an offshore floating production storage and offloading vessel (FPSO) so as to be in fluid communication with a fluid reservoir therein;
  coupling the first end of the hose to a shuttle tanker and for example to a bow loading system thereof, thereby to open the valve arrangement and effect a fluid connection between a fluid storage on the shuttle tanker and the fluid storage on the FPSO;
  transferring fluid from the fluid storage on the FPSO to the fluid storage on the shuttle tanker.

DETAILED DESCRIPTION

Figure 1:
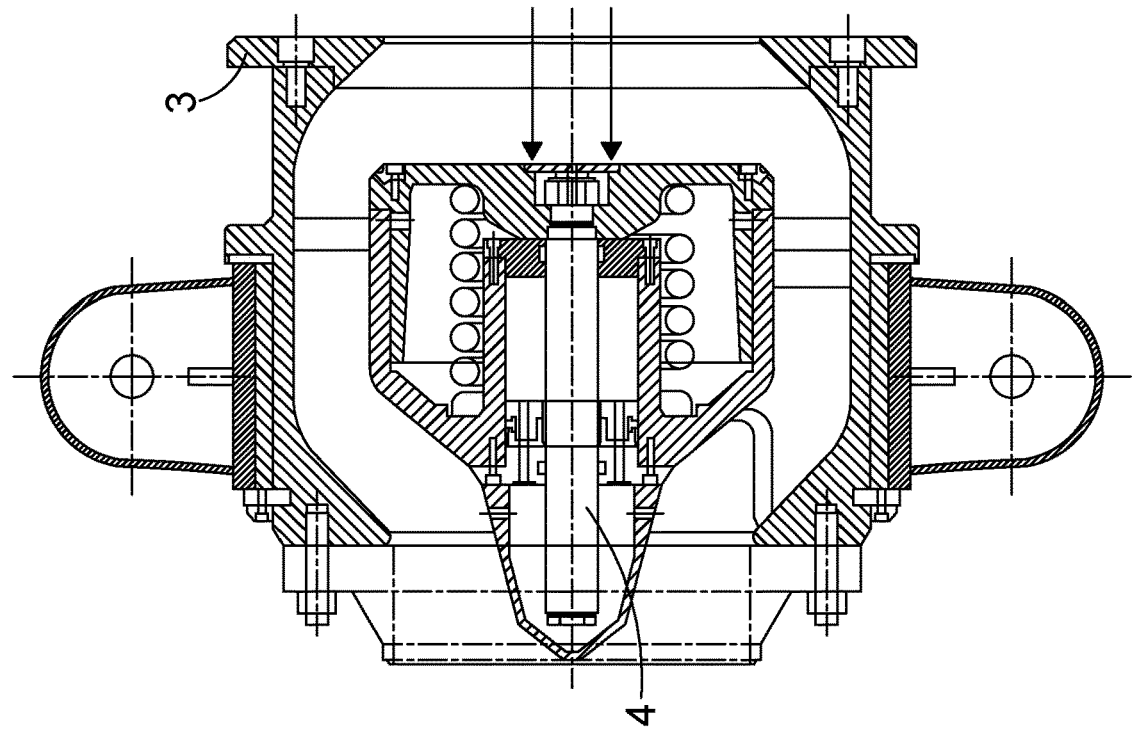
FIG. 1 shows a simple prior art hose end coupler linear valve of the design commonly called a North Sea Type Hose End Valve or Offloading Hose Termination Piece.
Figure 1:
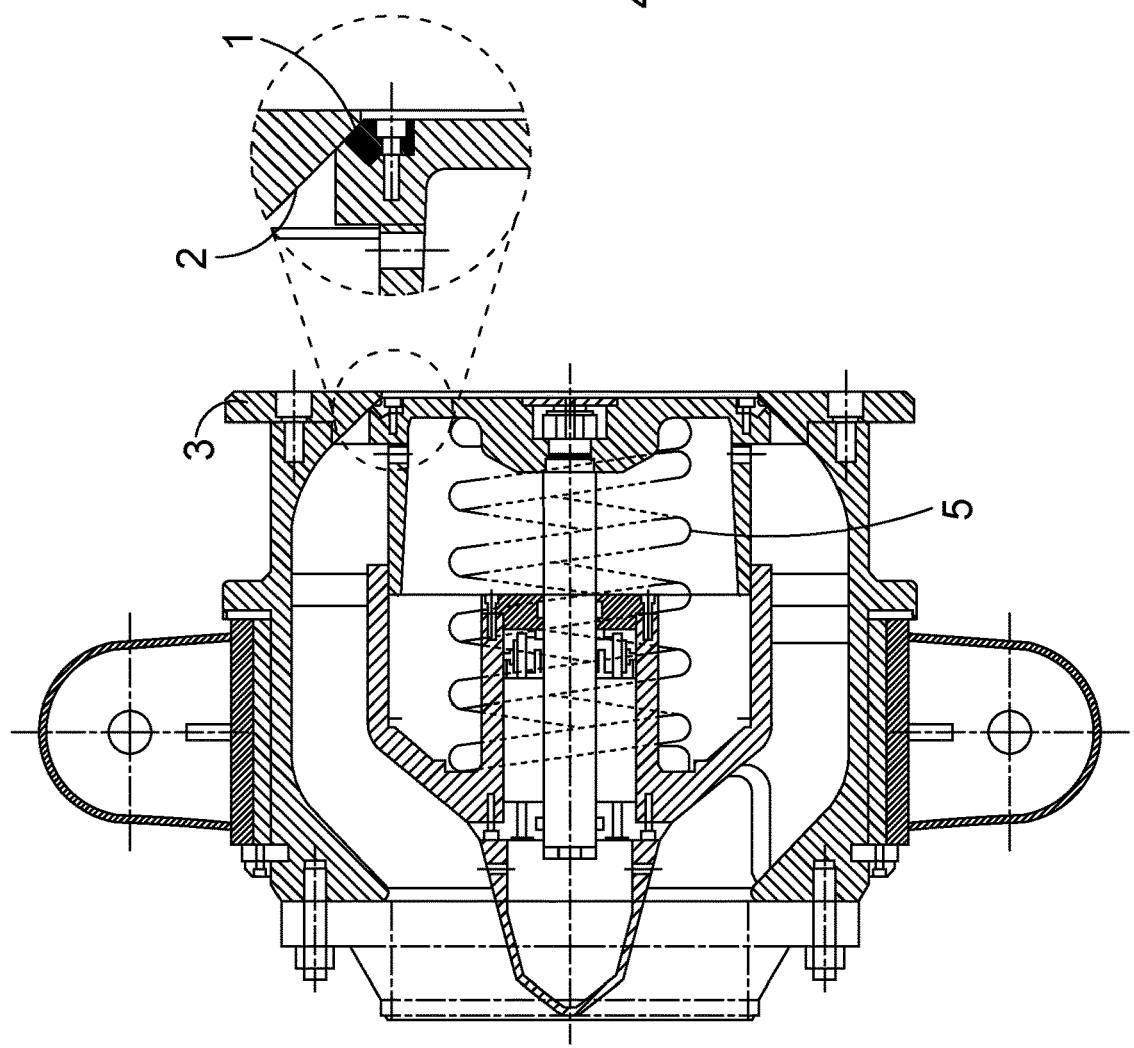

FIG. 1 has been discussed above in the context of the prior art.

Nevertheless, since it is a particular advantageous feature of the dual valve arrangement of the present invention that the linear valve part of the dual valve is fully compatible with existing off-loading platforms and standards, it is consequently advantageous for the linear valve of the dual valve of the invention to be of conventional design, and the valve of FIG. 1 is therefore additionally illustrative of features of the linear valve part of the embodiment of the present invention.

FIG. 1 shows the valve in a closed configuration on the left hand side and in an open configuration on the right hand side. As is familiar the valve is typically used to effect a connection during a transfer operation between a transfer hose extending from and fluidly in communication with an offshore floating production storage and offloading vessel (FPSO) and a suitable inlet to a shuttle tanker. In each case as illustrated, the valve is shown with a shuttle tanker side on the right hand side and a transfer hose/FPSO side on the left hand side of the drawings. In each case, a connection would be made to the shuttle tanker during a transfer operation via the flange on the right hand, tanker connection, side in the drawings, and a transfer hose would extend to the FPSO from the left hand side of the drawings.

In use, as the transfer valve with the hose end coupler illustrated in FIG. 1 is brought across to and coupled to the bow loading system of a shuttle tanker, a coupling mechanism on the shuttle tanker will engage with the flange 3 on the valve housing, causing actuation means within the coupling arrangement on the shuttle tanker to bear upon a piston-type linear actuator 4 within the valve, and cause it to move in the direction of the arrows to cause the valve to open. In this configuration, crude oil may be offloaded from the storage tanks in the FPSO via the transfer hose and through the valve into suitable storage volumes within the shuttle tanker in conventional manner.

The piston-type actuation member of the linear valve in FIG. 1 is biased closed by the spring 5, with the biasing force modified by an axially mounted hydraulic damper. The net effect of this arrangement is that once the coupling is removed, the valve closes in a controlled manner, with the piston-type actuator moving to the closed configuration shown in the left hand side of FIG. 1. A suitable sealing engagement is thereby made between a forward sealing surface of the piston formation and a complementary surface of the valve housing. One or both surfaces may be provided with a sealing element.

The enlarged detail shows the sealing engagement being effected in the particular example of FIG. 1 between an o-ring seal 1 inset into a forward outer edge of the piston formation and a complementary surface 2 of the valve housing. Other designs of sealing element may be appropriate.

Figure 2:
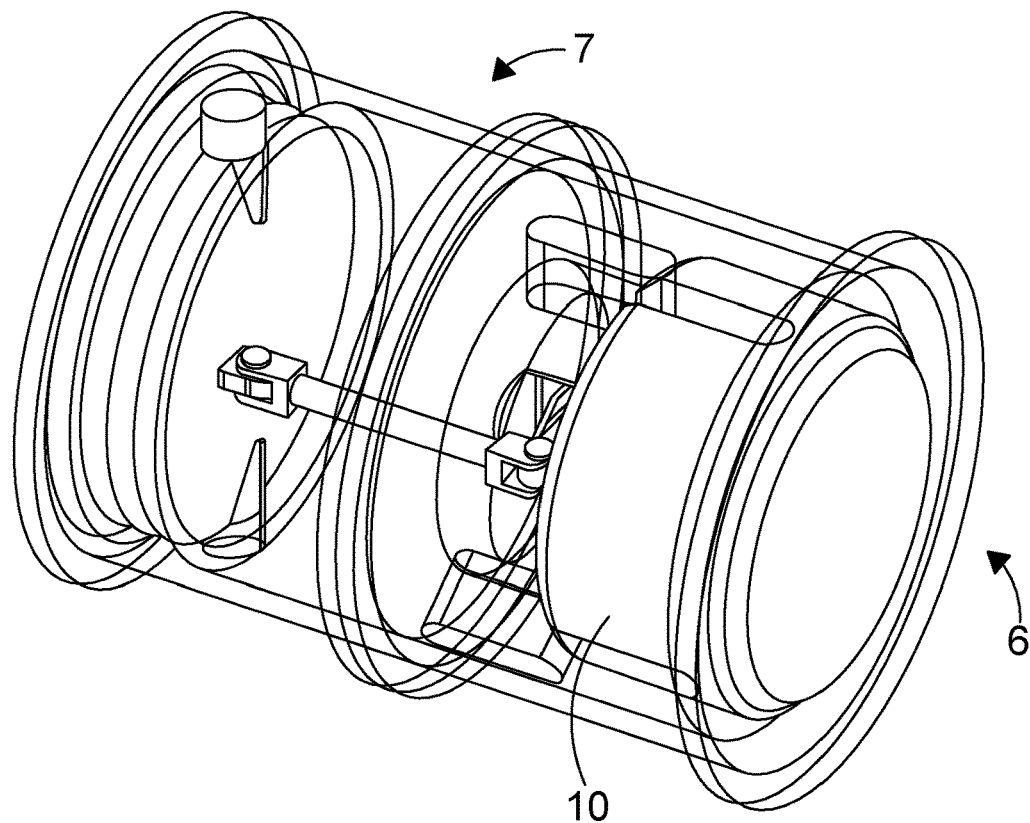
FIGS. 2 to 4 illustrate an embodiment of the dual valve system of the invention as it is progressively opened.
Figure 3:
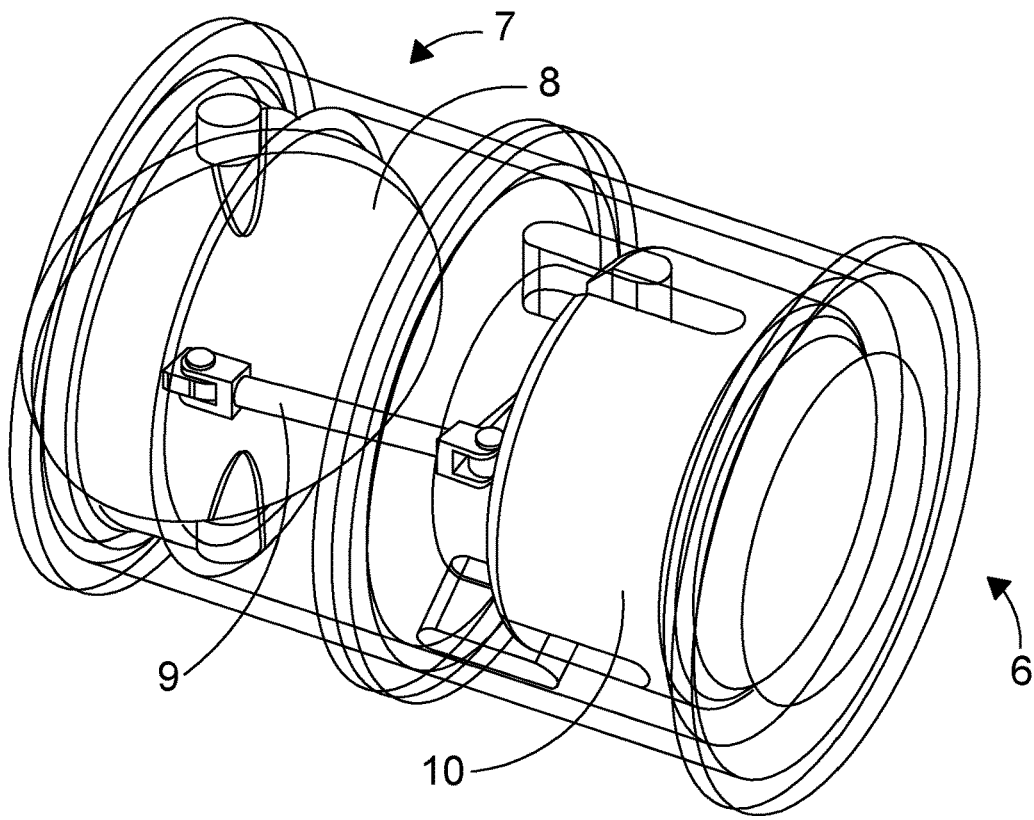
Figure 4:
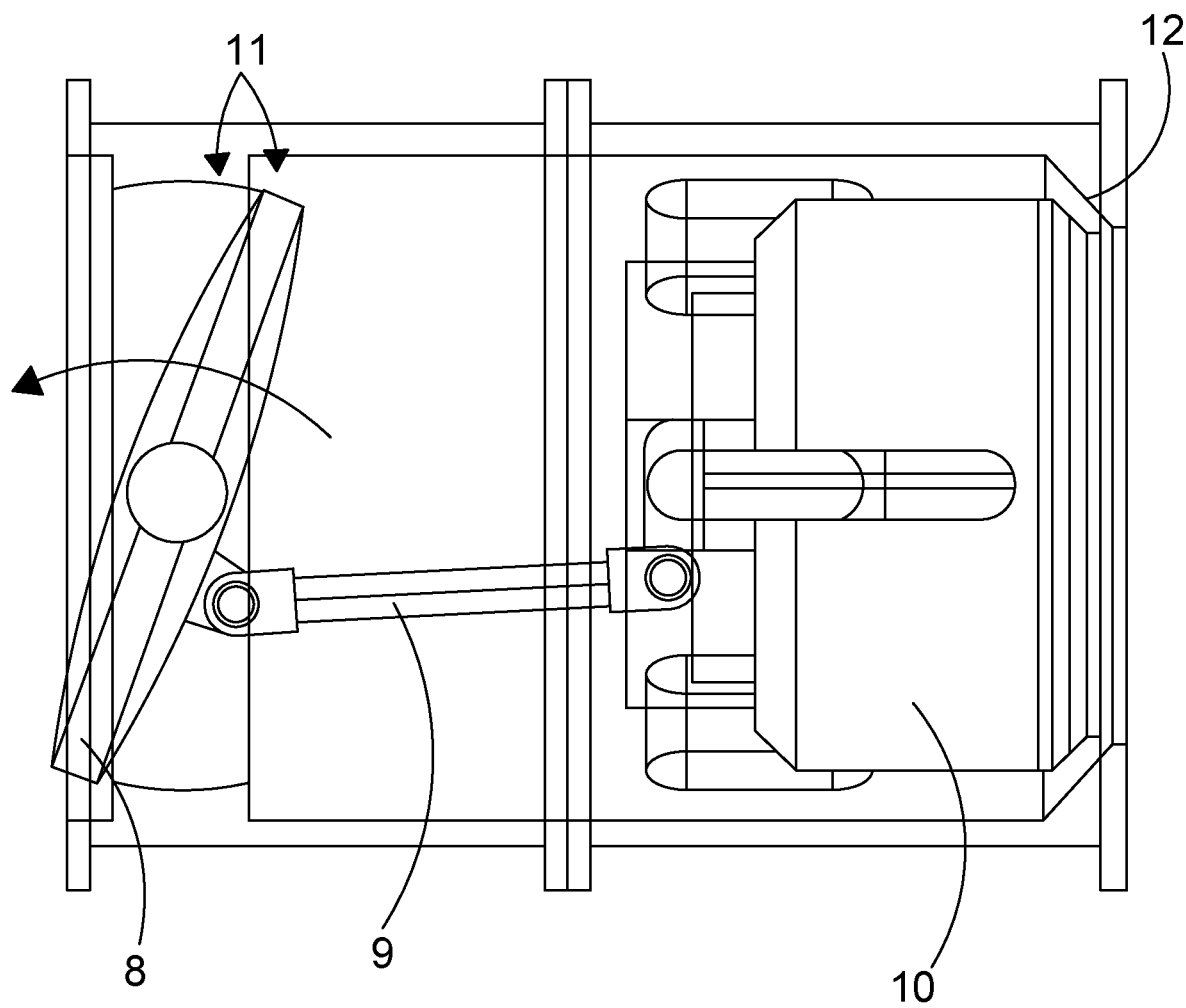

The modification of this principle to arrive at a dual valve embodiment of the first aspect of the invention, and its mode of operation, is shown schematically by the open frame perspective views of FIGS. 2 to 4.

A linear primary valve 6, which may be of suitable form to be compatible with existing systems, and is for example of the type illustrated in FIG. 1, is provided in conjunction with and operatively coupled to a secondary rotating valve 7. The rotating valve is a butterfly valve with a butterfly disc actuation formation 8. The arrangement is shown FIGS. 2 to 4 respectively and successively in a closed, partly open and fully open configuration.

The linear primary valve 6 is operated in conventional manner as above as a transfer hose incorporating the dual valve arrangement as an end valve is deployed for coupling, and the flange portion is engaged upon and coupled to a bow loading system of a shuttle tanker. The embodiment of the invention is distinctly characterised however by the provision of the secondary rotating valve, and of a direct operational coupling between the two valves, which in the particular example embodiment is offered by the mechanical arm 9 that provides a direct functional mechanical link between a rearward face of the translatable piston formation 10 of the primary valve 6 and an off-centre mounting on the rotatable disc actuator 8 of the secondary valve 7.

The effect of this during use, as illustrated in FIGS. 2 to 4, is that linear translation of the primary valve in an axial direction under the action of the coupling mechanism of the shuttle tanker is mechanically coupled to cause rotation of the disc actuator 8 out of its closed position and into open position.

The valve actuators are operatively coupled, such that the action of opening the primary valve opens the secondary valve, and the closure of the primary valve also effects closure of the secondary valve. Thus, the action of coupling to the bow loading system opens the primary valve and consequently the secondary valve and the act of decoupling causes the primary valve to close and consequently closes the secondary valve.

Figure 5:
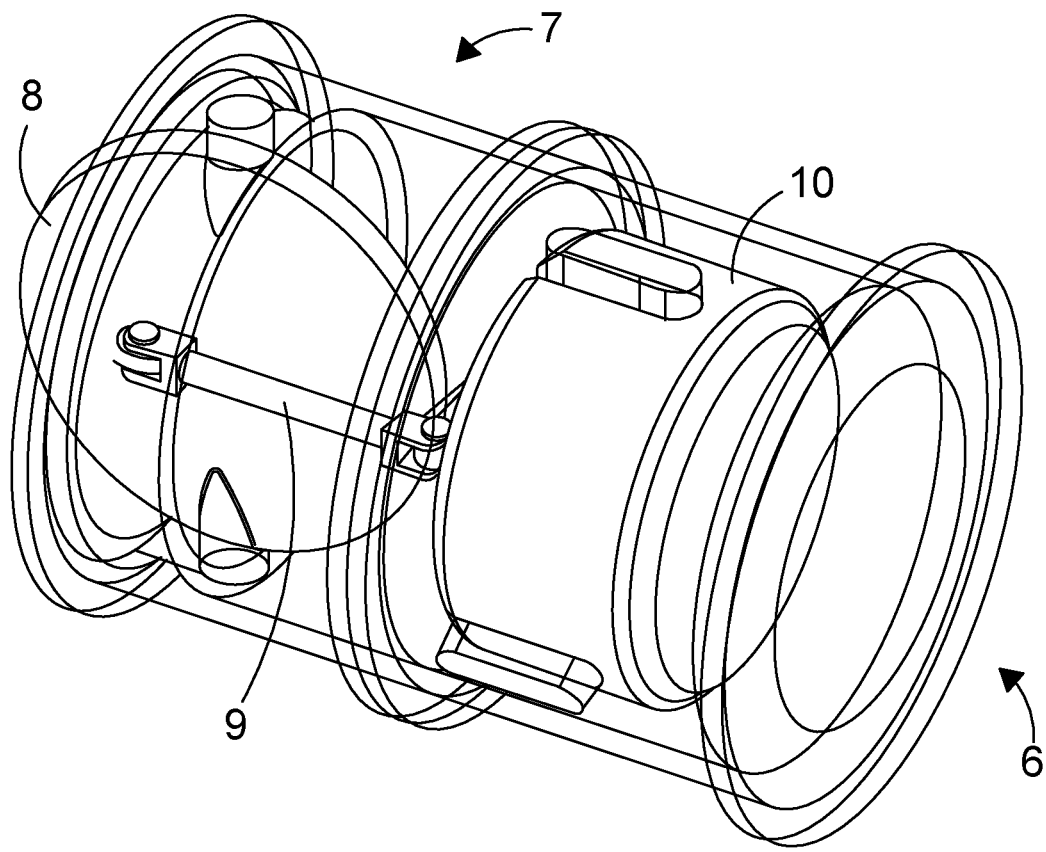
FIG. 5 shows the embodiment in cross-section.

A particular advantage in accordance with the embodiment illustrated of the use of a secondary valve based on a butterfly principle with a disc actuator 8 is that the different functions of the two valves may produce different and potentially complementary effects, in particular in that their different sealing arrangements may advantageously give a synergistic degree of functionality. This is illustrated in the cross section in FIG. 5 showing the linear reciprocation in an axial direction of the translatable piston formation 10 relative to its sealing faces 12, and the rotational motion of the disk formation 8 relative to its sealing faces 11. The latter may produce a sweeping action which can be particularly effective at clearing debris from the valve, mitigating the risk of fouling and leakage, especially in an emergency shutdown situation.

Figure 6:
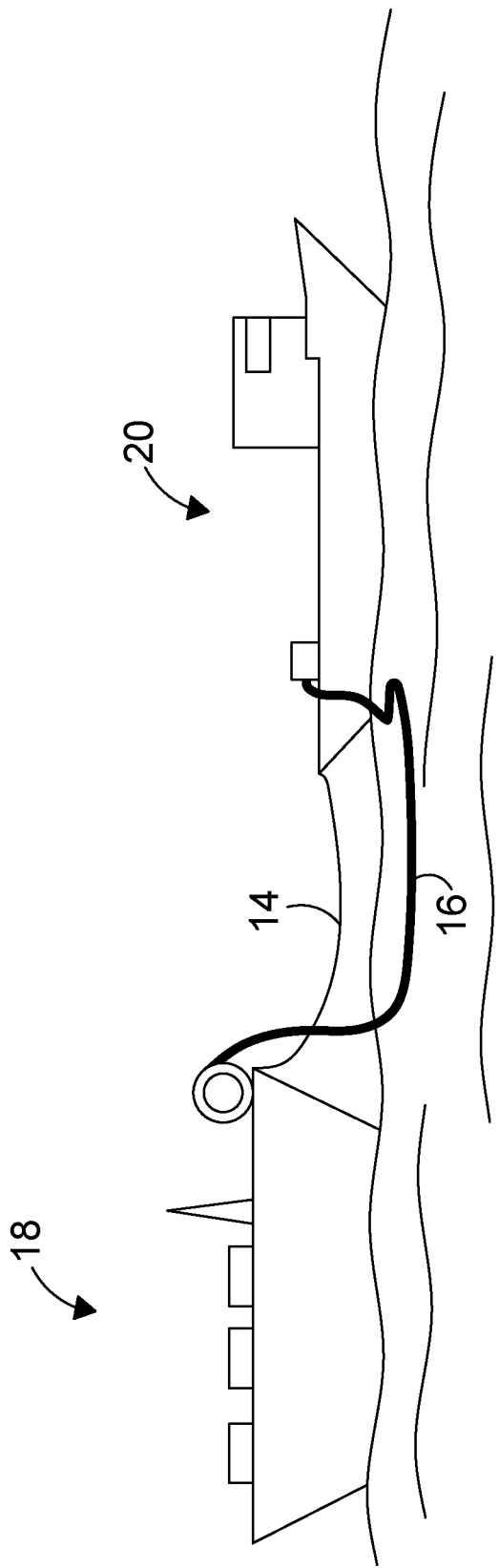
FIG. 6 shows a system deployed for offloading from an FPSO to a shuttle tanker.

An example of the deployment of the invention in use is shown in FIG. 6. The figure shows a simplified FPSO 18 and offloading shuttle tanker 20, where the tanker 20 is moored to the FPSO 18 via a hawser 14, and the hose string 16 provides a fluid connection between the FPSO 18 and the tanker 20 allowing, for example, crude oil to be transferred from the FPSO to the tanker. A dual valve in accordance with the principles of the invention is provided at the distal end of the hose string 16 where it is coupled to the Bow Loading System or BLS of the tanker and is actuated in the manner illustrated in FIGS. 2 to 4 by the action of such a coupling.

The invention claimed is:

1. A valve arrangement for a hose end coupler of a transfer hose for the offloading of hydrocarbons from an offshore floating production storage and offloading vessel (FPSO) to a shuttle tanker comprising:
   a linear valve comprising a linear valve actuator movable between a first position whereat the valve is closed and a second position whereat the valve is open;
   a secondary valve comprising a secondary valve actuator movable between a first position whereat the valve is closed and a second position whereat the valve is open;
   wherein the linear valve actuator and the secondary valve actuator are operatively coupled such that movement of the linear valve actuator between the first position and the second position effects a corresponding movement of the secondary valve actuator between the first position and the second position; and
   the secondary valve comprises a rotating valve having a secondary rotating valve actuator carried within a valve housing that is mounted to be rotatable between a first position whereat the valve is closed and a second position whereat the valve is open.

2. The valve arrangement in accordance with claim 1 wherein the secondary rotating valve actuator is mounted to be rotatable between the first position whereat the secondary valve actuator is in sealing engagement with a portion of a valve housing and the second position whereat the valve is not in sealing engagement with a portion of the valve housing.

3. The valve arrangement in accordance with claim 1 wherein the linear valve actuator and the secondary valve actuator are operatively coupled such that linear movement of the linear valve actuator causes rotation of the secondary rotating valve actuator.

4. The valve arrangement in accordance with claim 1 wherein the secondary valve comprises a rotating butterfly valve.

5. The valve arrangement in accordance with claim 4 wherein the secondary valve comprises a rotating valve in which the valve actuator comprises a disc carried within a valve housing and mounted to rotate between a first position whereat an edge portion of the disc is in sealing engagement with a portion of a valve housing and a second position whereat the edge portion of the disc is not in sealing engagement with a portion of the valve housing.

6. The valve arrangement in accordance with claim 1 combined with a coupling arrangement to comprise a hose end coupler, wherein the linear valve is adapted to be actuated to the open position by a coupling mechanism on a shuttle tanker when the hose end coupler is coupled to such a coupling mechanism in use.

7. The valve arrangement in accordance with claim 1 mounted into a product transfer hose end such that the linear valve actuator is translatable in a hose axial direction.

8. The valve arrangement in accordance with claim 1 wherein the linear valve actuator is contained within a valve housing and mounted to be translatable between a first position whereat the linear valve actuator is in a face to face sealing engagement with a portion of the valve housing and a second position whereat the linear valve actuator is not in a face to face sealing engagement with the said portion of the valve housing.

9. The valve arrangement in accordance with claim 8 wherein a distal portion of the linear valve actuator and an engagement portion of the valve housing are adapted to provide mutually engageable sealing surfaces when the linear valve actuator is in the first position.

10. The valve arrangement in accordance with claim 8 wherein the linear valve actuator comprises a linearly translatable piston formation carried by and translatable relative to a holding formation so as to be movable between the first position and the second position.

11. The valve arrangement in accordance with claim 10 wherein the piston formation is biased to return to the first position.

12. The valve arrangement in accordance with claim 11 wherein the piston formation is spring biased to return to the first position.

13. The valve arrangement in accordance with claim 11 wherein the bias is damped by provision of a hydraulic or pneumatic damper.

14. The valve arrangement in accordance with claim 1 wherein the linear valve and the secondary valve are operatively coupled by an actuating connection such that movement of the linear valve actuator between the first position and the second position causes via the actuating connection a corresponding movement of the secondary valve actuator between the first position and the second position.

15. The valve arrangement in accordance with claim 14 wherein the actuating connection comprises a direct physical link between the linear valve actuator and the secondary valve actuator.

16. The valve arrangement in accordance with claim 15 wherein the direct physical link comprises a mechanical link and/or a hydraulic link.

17. The valve arrangement in accordance with claim 16 wherein the linear valve actuator is a rotating valve having a rotating valve actuator comprising a disc actuator and the linear valve actuator is a translatable actuator and a direct mechanical link is provided between the linear valve actuator and the disc actuator such that translation of the linear valve actuator acts directly to cause rotation of the disc actuator.

18. The valve arrangement in accordance with claim 1 disposed as a hose end valve in a transfer hose for use in the offloading of hydrocarbons from an offshore floating production storage and offloading vessel (FPSO) to a shuttle tanker.

19. A product transfer hose for the offloading of hydrocarbons from an offshore floating production storage and offloading vessel (FPSO) to a shuttle tanker comprising an elongate hose defining a conduit for the passage of hydrocarbons between a first end and a second end and having at one of the said ends a valve arrangement in accordance with claim 1.

20. The product transfer hose in accordance with claim 19 wherein the valve arrangement is provided at the said one end of the elongate hose arranged such that the linear valve is positioned at the hose outlet and the secondary valve is positioned behind the linear valve, spaced away from the hose outlet.

21. The product transfer hose in accordance with one of claim 19 wherein the said one of the ends of the transfer hose includes a coupling formation that is adapted to engage with a complementary coupling arrangement on an off shore shuttle tanker, with the valve arrangement carried in the said end of the transfer hose being configured such that the action of effecting such a coupling causes the linear and secondary valves to move from the closed to the open position.

22. The product transfer hose in accordance with claim 19 supplied in combination with an offshore floating production storage and offloading vessel (FPSO) having a fluid reservoir, the said other of the said ends being in fluid communication with the fluid reservoir.

23. An off-loading system for the off-loading of hydrocarbons from an offshore floating production storage and offloading vessel (FPSO) to a shuttle tanker comprising: an FPSO, a shuttle tanker, and a transfer hose fluidly coupled to the FPSO and selectively fluidly coupleable to the shuttle tanker, said transfer hose comprising a transfer hose in accordance with claim 19.

24. A method for the off-loading of hydrocarbons from an offshore floating production storage and offloading vessel (FPSO) to a shuttle tanker comprising:
   providing a hose defining a conduit for the passage of hydrocarbons between a first end and a second end and having at one of the said ends a valve arrangement comprising:
      a linear valve comprising a linear valve actuator movable between a first position whereat the valve is closed and a second position whereat the valve is open;
      a secondary valve comprising a secondary valve actuator movable between a first position whereat the valve is closed and a second position whereat the valve is open;
      wherein the linear valve actuator and the secondary valve actuator are operatively coupled such that movement of the linear valve actuator between the first position and the second position effects a corresponding movement of the secondary valve actuator between the first position and the second position; and
      the secondary valve comprises a rotating valve having a secondary rotating valve actuator carried within a valve housing that is mounted to be rotatable between a first position whereat the valve is closed and a second position whereat the valve is open;
   fluidly connecting the other end of the hose to an FPSO so as to be in fluid communication with a fluid reservoir therein;
   coupling the first end of the hose to a shuttle tanker and thereby causing the valve arrangement to open, and to effect a fluid connection between a fluid storage on the shuttle tanker and the fluid storage on the FPSO;
   transferring fluid from the fluid storage on the FPSO to the fluid storage on the shuttle tanker.

* * * * *